Figure 1:
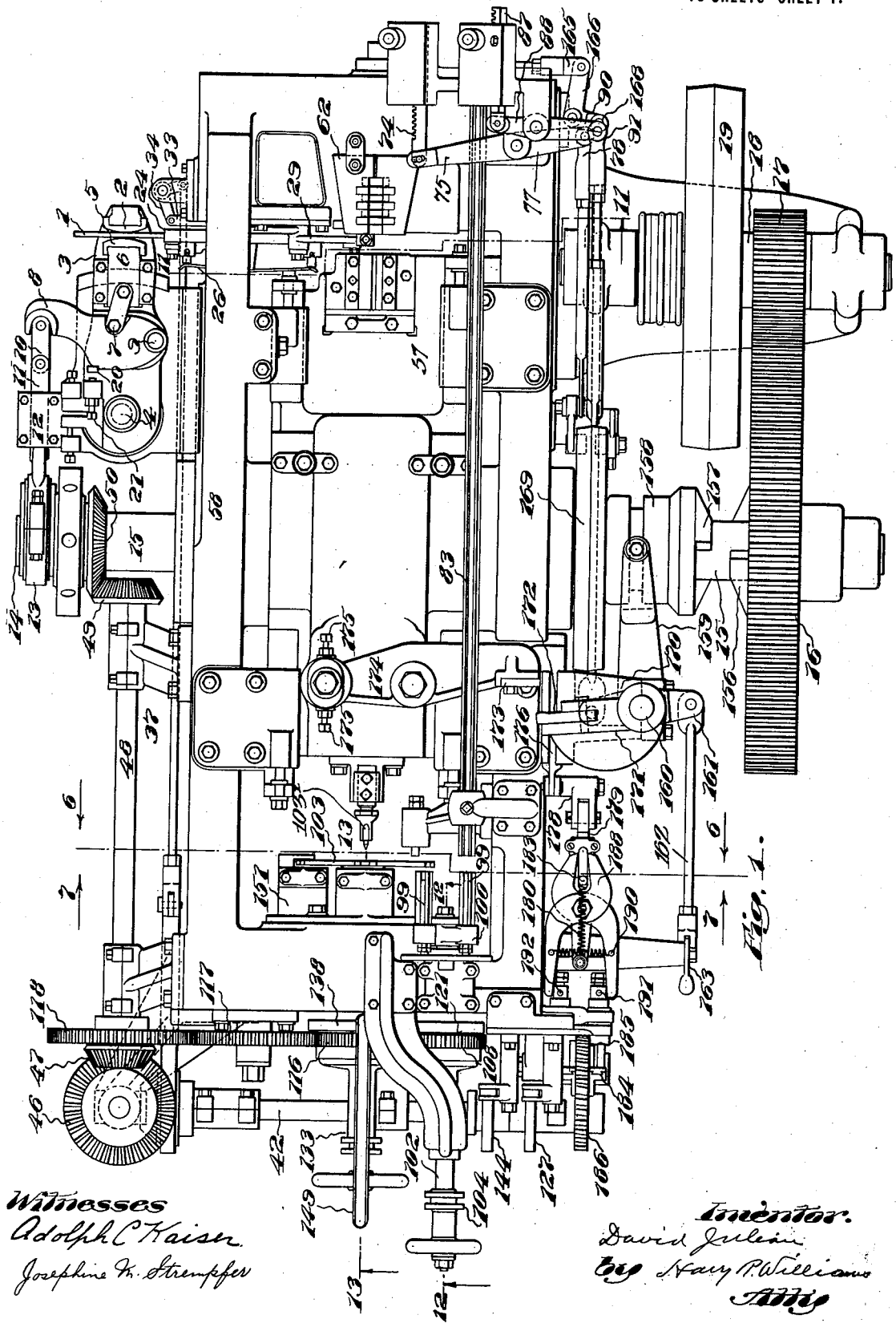

D. JULIAN.
NUT MACHINE.
APPLICATION FILED AUG. 8, 1914.

1,242,199.

Patented Oct. 9, 1917.
13 SHEETS—SHEET 1.

D. JULIAN.
NUT MACHINE.
APPLICATION FILED AUG. 8, 1914.

1,242,199.

Patented Oct. 9, 1917.
13 SHEETS—SHEET 2.

Witnesses:
Adolph C. Kaiser
Josephine M. Strempfer

Inventor:
David Julian
Harry P. Williams
Attys.

D. JULIAN.
NUT MACHINE.
APPLICATION FILED AUG. 8, 1914.

1,242,199.

Patented Oct. 9, 1917.
13 SHEETS—SHEET 3.

Witnesses:
Adolph C. Kaiser.
Josephine M. Strempfer.

Inventor:
David Julian
by Harry P. Williams
Atty.

D. JULIAN.
NUT MACHINE.
APPLICATION FILED AUG. 8, 1914.

1,242,199.

Patented Oct. 9, 1917.
13 SHEETS—SHEET 6.

Witnesses:
Adolph C. Kaiser.
Josephine M. Strempfer.

Inventor
David Julian
by Harry P. Williams
Atty.

D. JULIAN.
NUT MACHINE.
APPLICATION FILED AUG. 8, 1914.

1,242,199.

Patented Oct. 9, 1917.
13 SHEETS—SHEET 8.

D. JULIAN.
NUT MACHINE.
APPLICATION FILED AUG. 8, 1914.
1,242,199.
Patented Oct. 9, 1917.
13 SHEETS—SHEET 9.
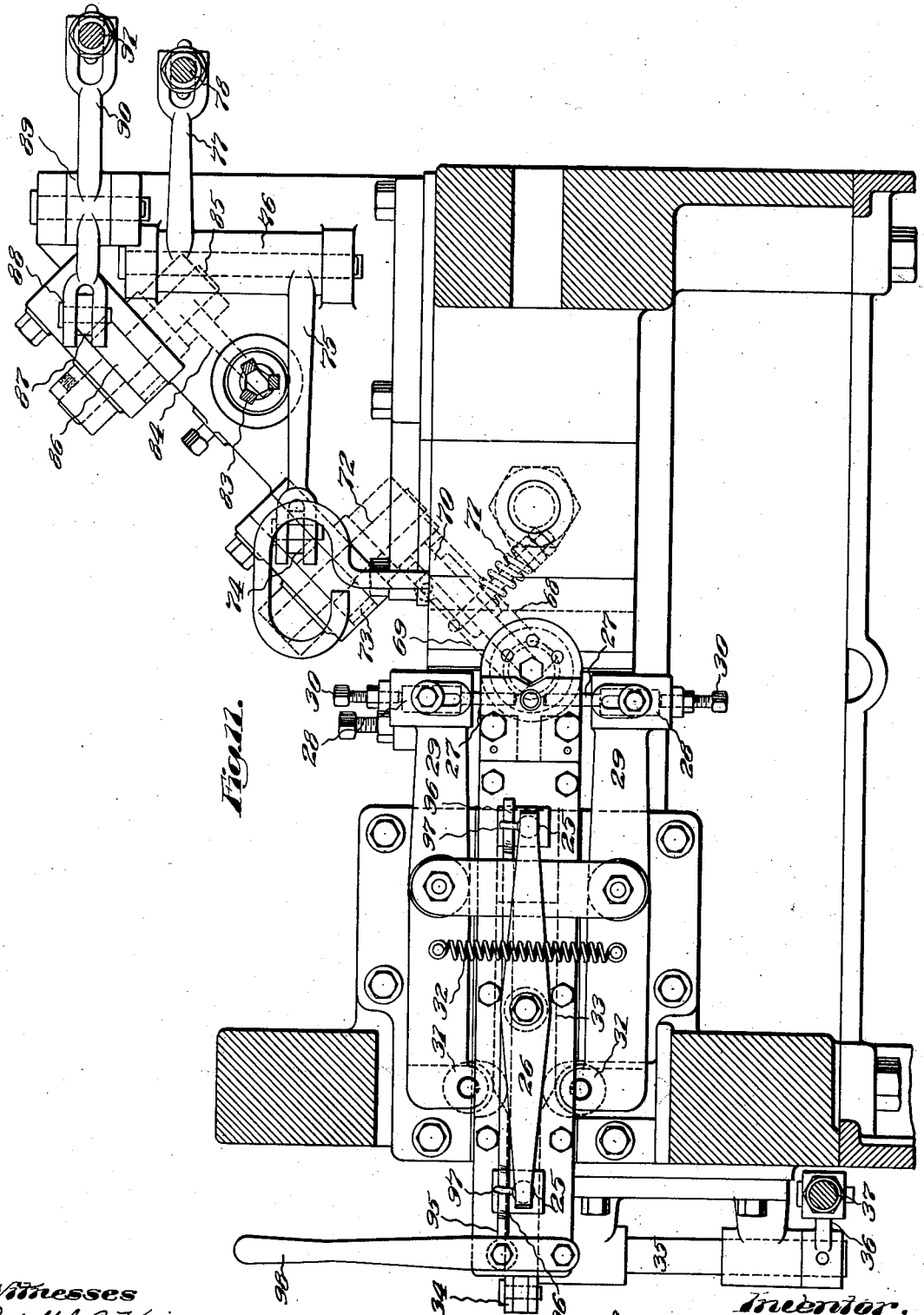

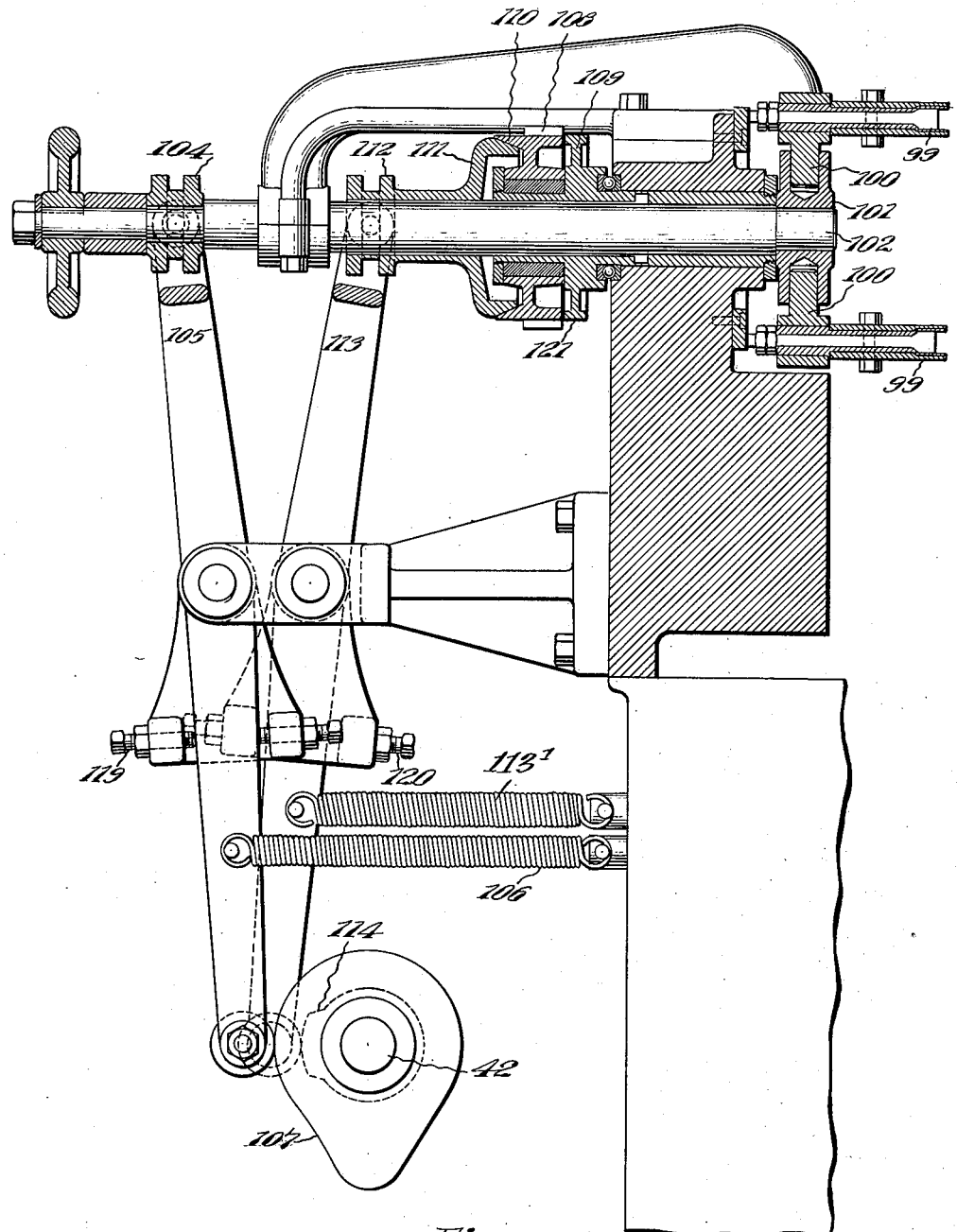

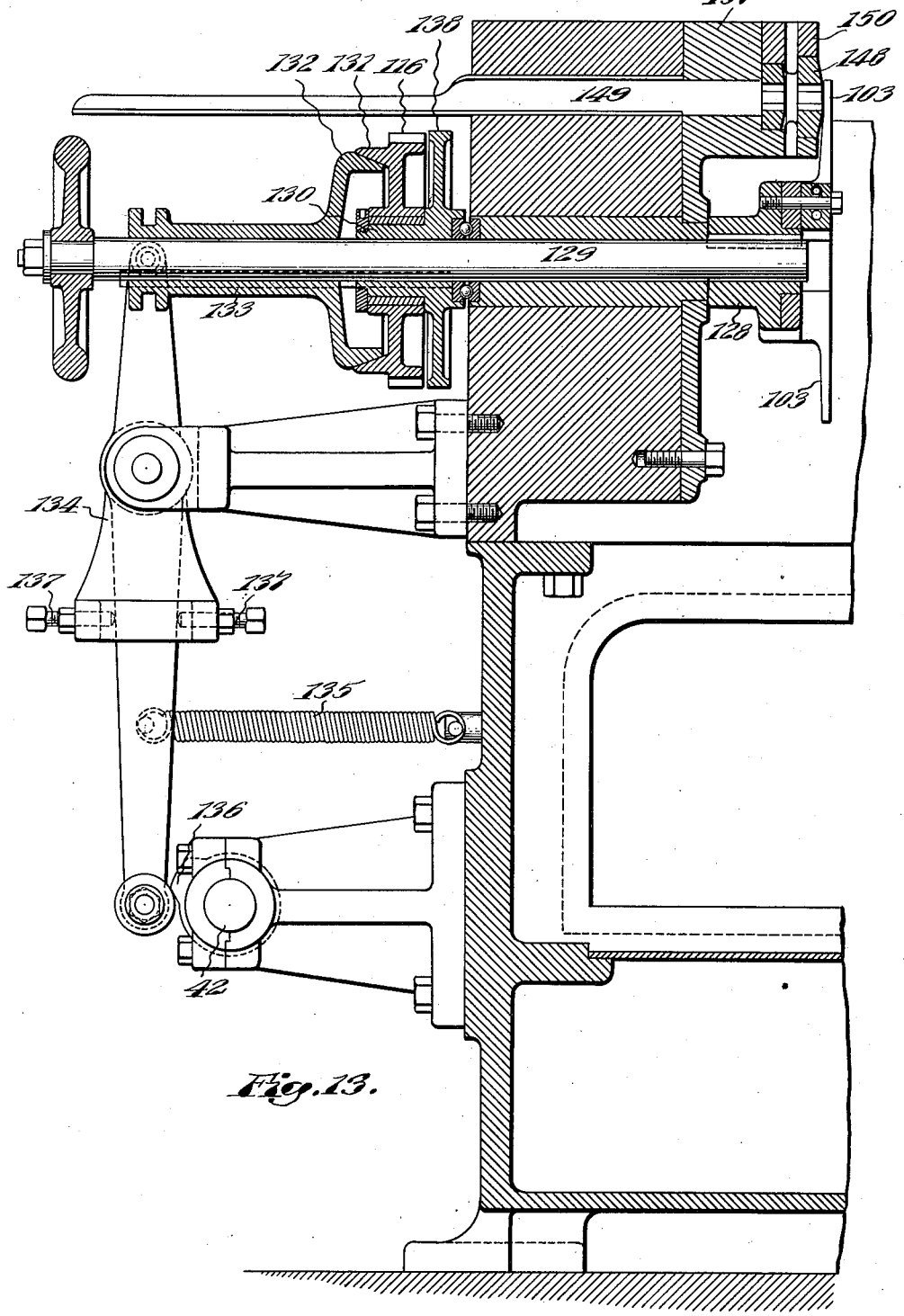

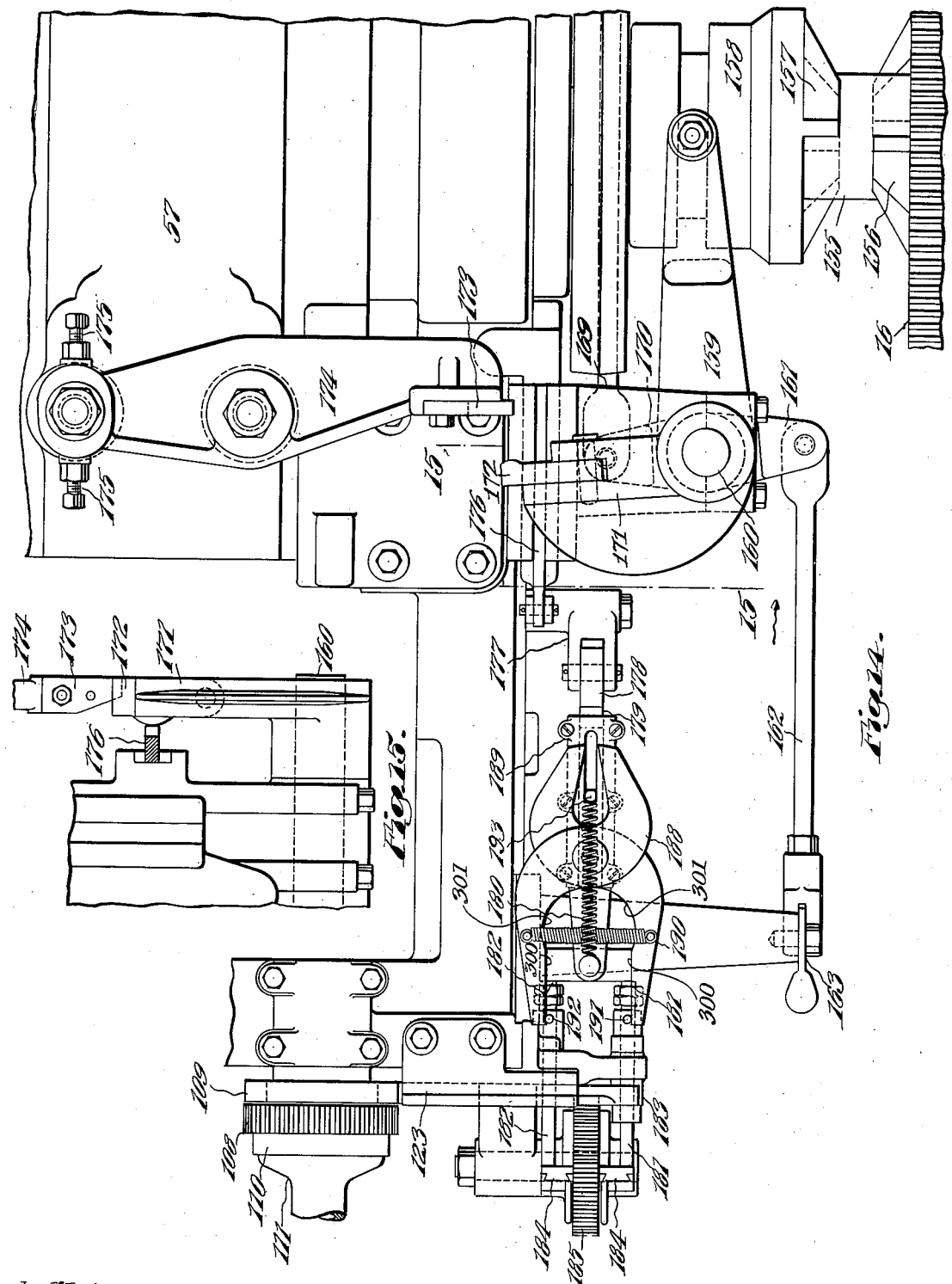

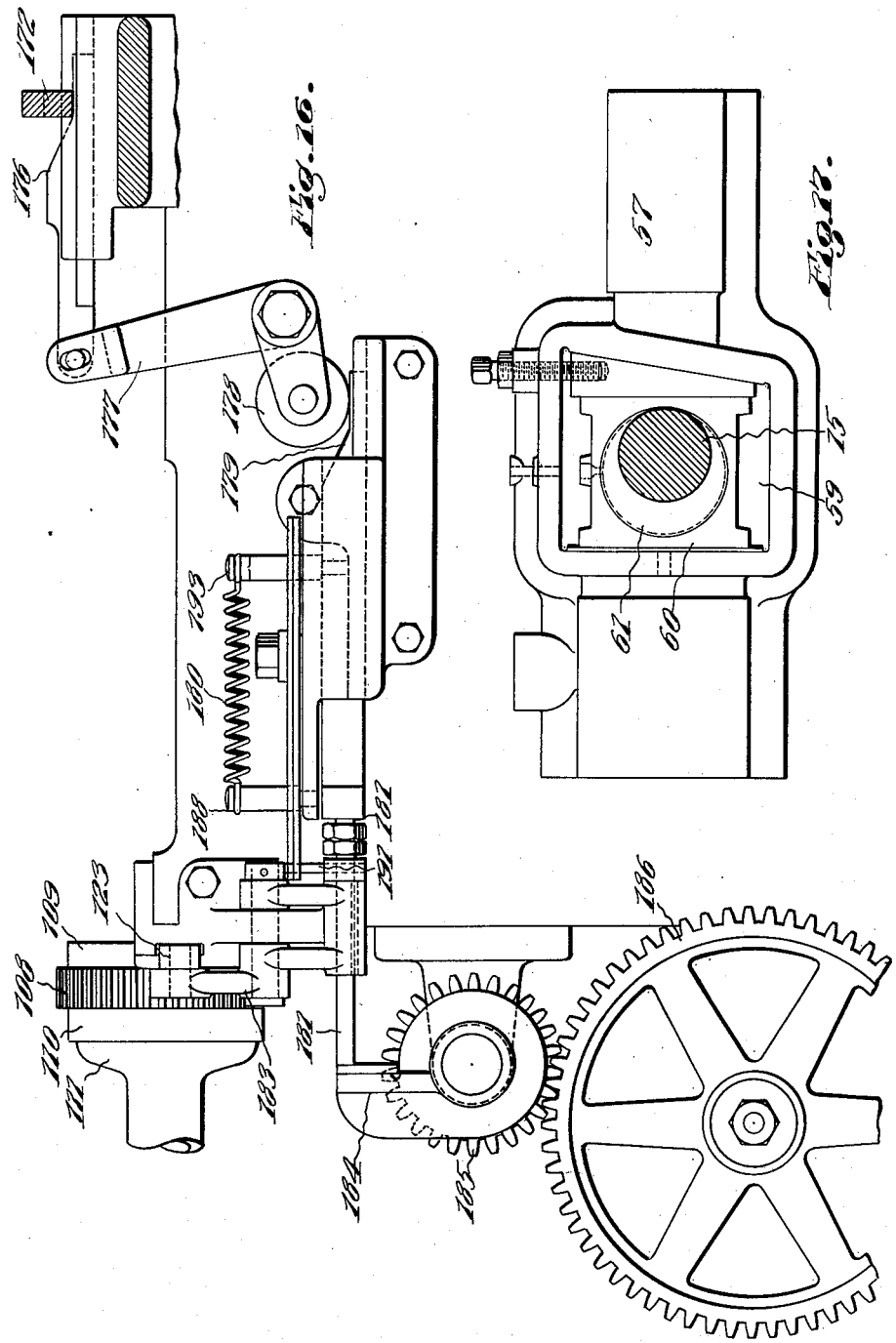

UNITED STATES PATENT OFFICE.

DAVID JULIAN, OF WATERBURY, CONNECTICUT, ASSIGNOR, BY MESNE ASSIGNMENTS, TO RUSSELL, BURDSALL & WARD BOLT AND NUT COMPANY, OF PORT CHESTER, NEW YORK, A CORPORATION OF NEW YORK.

NUT-MACHINE.

1,242,199. Specification of Letters Patent. Patented Oct. 9, 1917.

Application filed August 8, 1914. Serial No. 855,901.

*To all whom it may concern:*

Be it known that I, DAVID JULIAN, a citizen of the United States, residing at Waterbury, in the county of New Haven and State of Connecticut, have invented a new and useful Improvement in Nut-Machines, of which the following is a specification.

This invention relates to a machine which is designed to automatically form nut blanks by a cold process from a bar of metal.

The object of the invention is to construct a machine of this class which will rapidly produce accurately sized nut blanks of the larger sizes from a bar of metal.

In the embodiment of the invention illustrated, a bar of stock is intermittently fed the width of a nut blank into the machine. This bar is centered and pierced and then after being fed again the pierced piece is punched off into a cutting die that approximates the final shape of the nut. The successive blanks that are cut from the bar force those which have been previously cut through a first trimming die, then a second trimming die, and finally a third trimming die, which dies gradually reduce the blanks to size. These blanks are than transferred to a track and those in front advanced by the push of those which follow along the track to a transfer mechanism which takes the blanks one at a time and gives them to a carrier which presents them successively to a flattening die, a chamfering die, a repunching die, and then a final trimming die through which the blanks are pushed to a delivery rack. The piercing, cutting and trimming dies are mounted in the frame at one end, and the flattening, chamfering, repunching and final trimming dies are mounted in the frame at the other end, and the several punches that coöperate with the dies are mounted on opposite ends of a ram, or slide that is reciprocated in the frame so that at each movement in each direction several operations are performed on the bar and the blanks cut therefrom.

Figure 2:
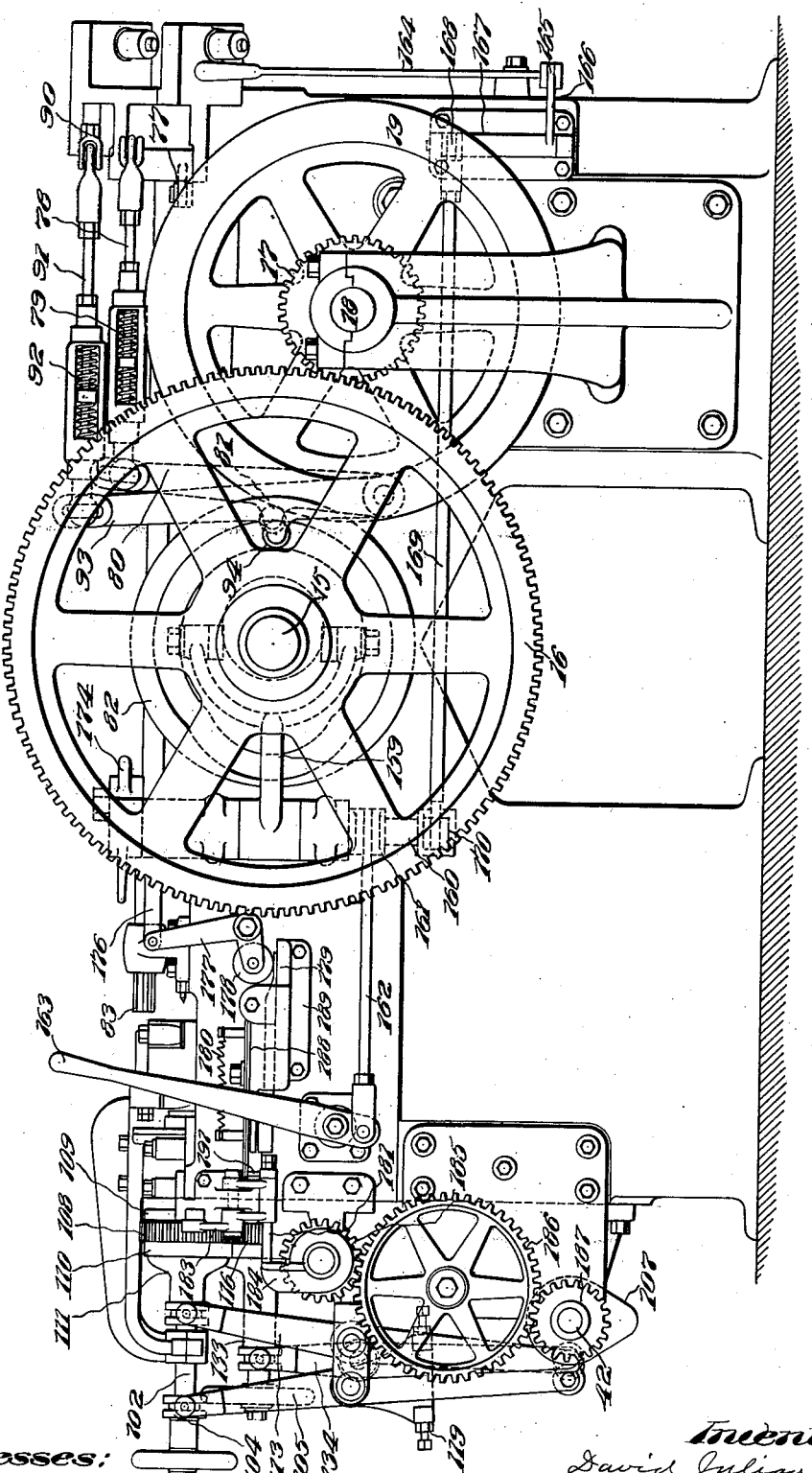
Figure 3:
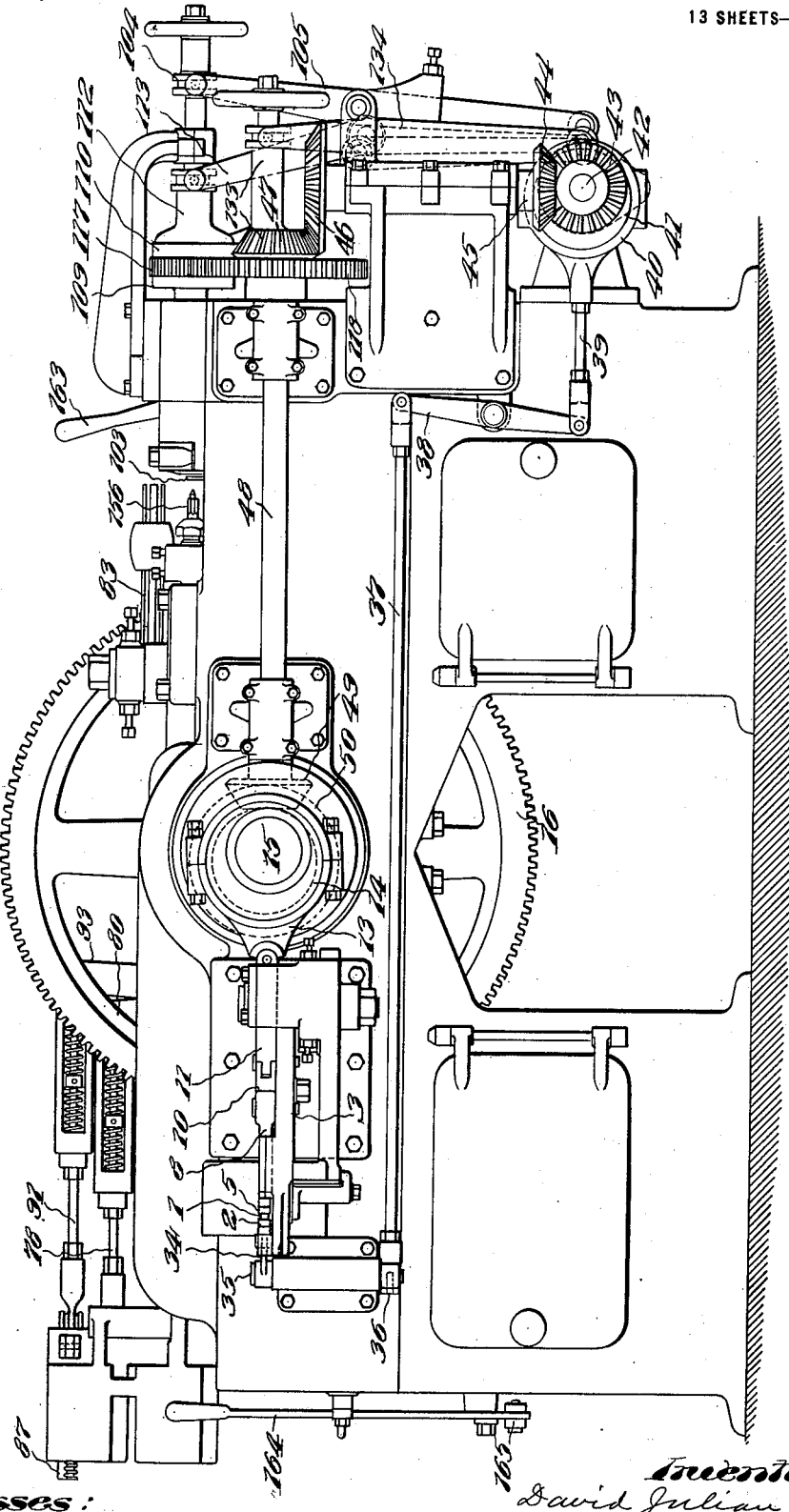
Figure 4:
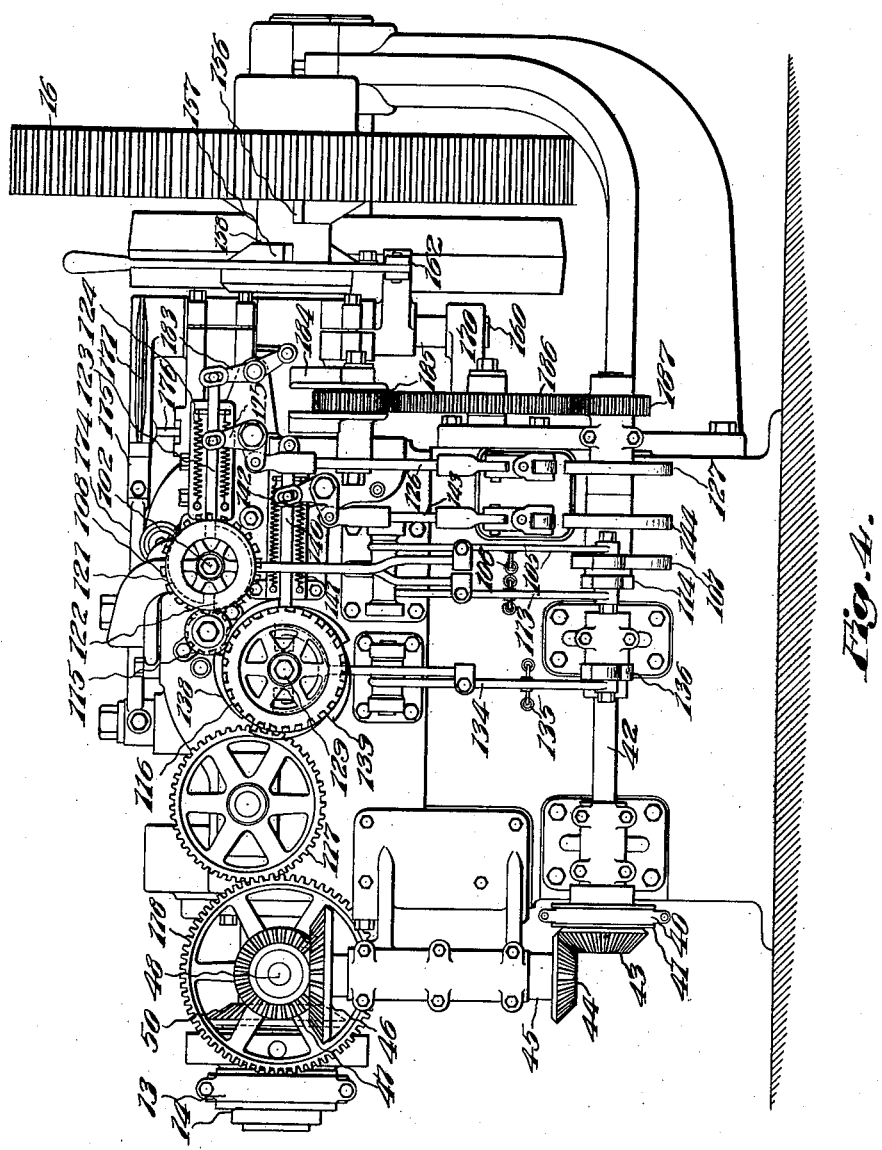
Figure 5:
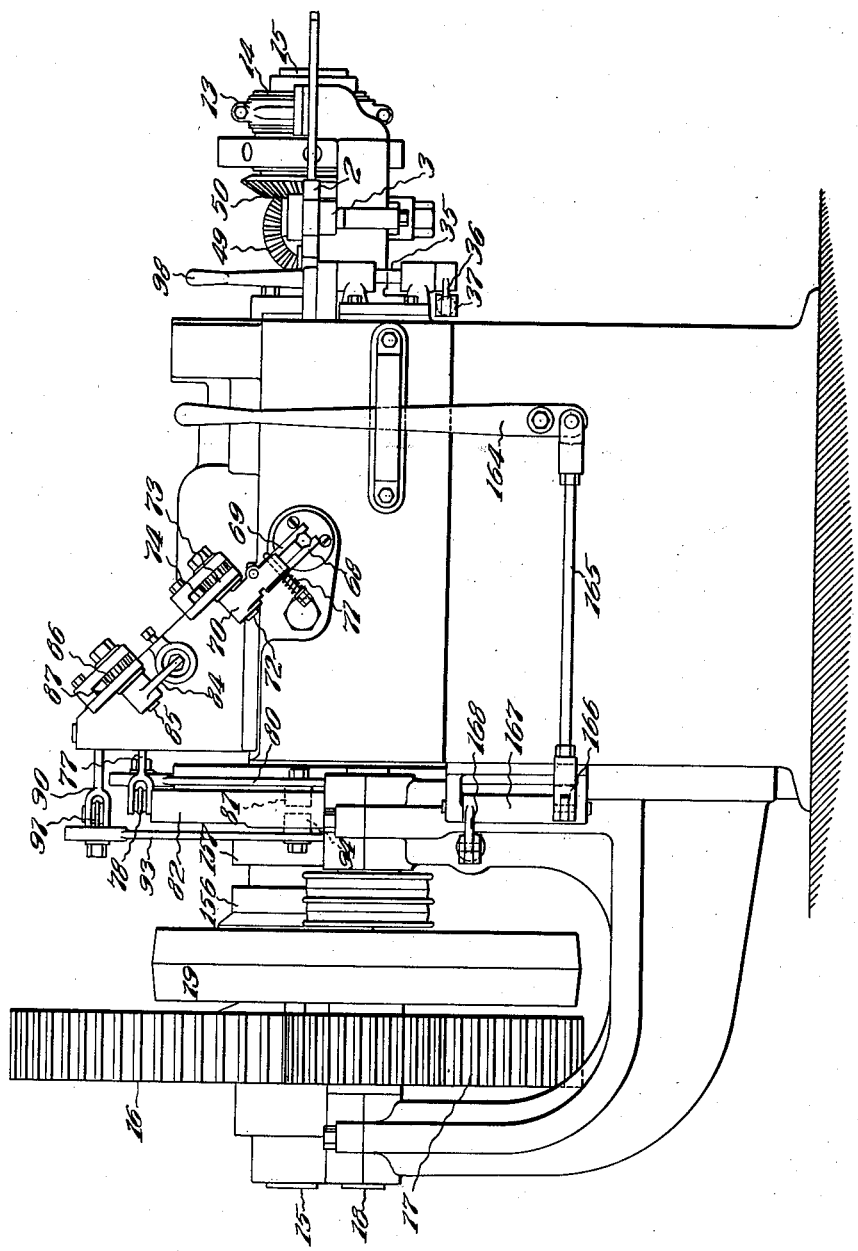
Figure 6:
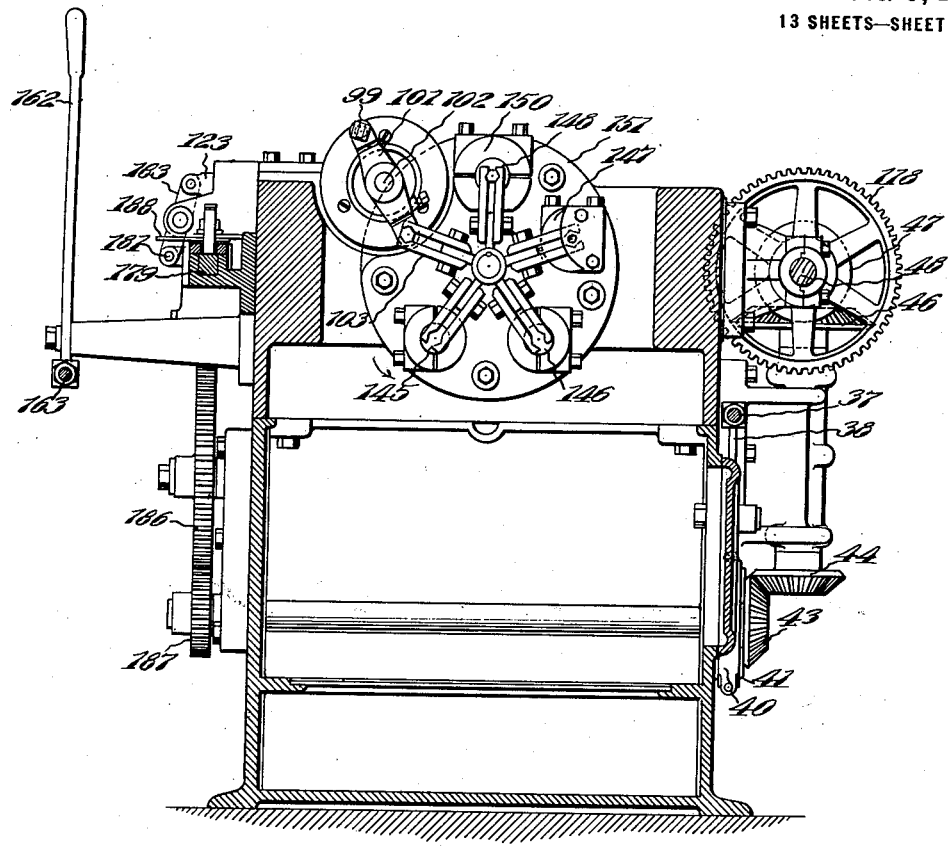
Figure 7:
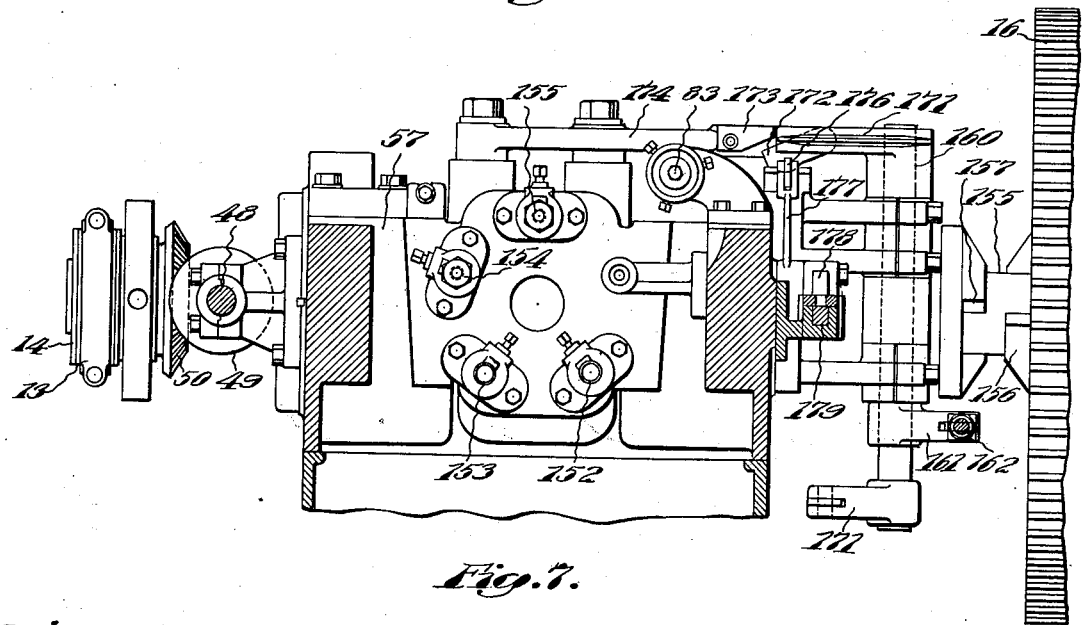
Figure 8:
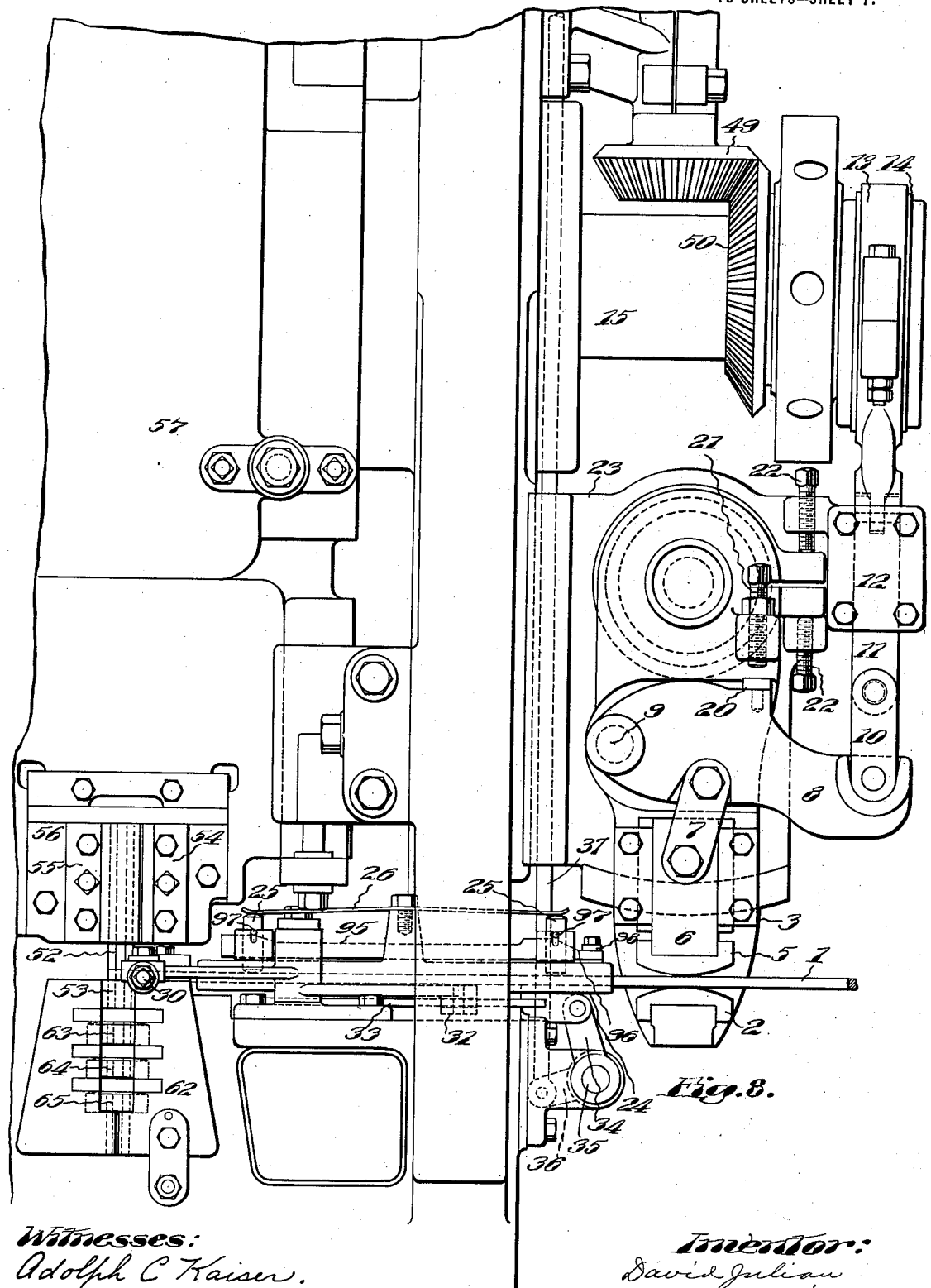
Figure 9:
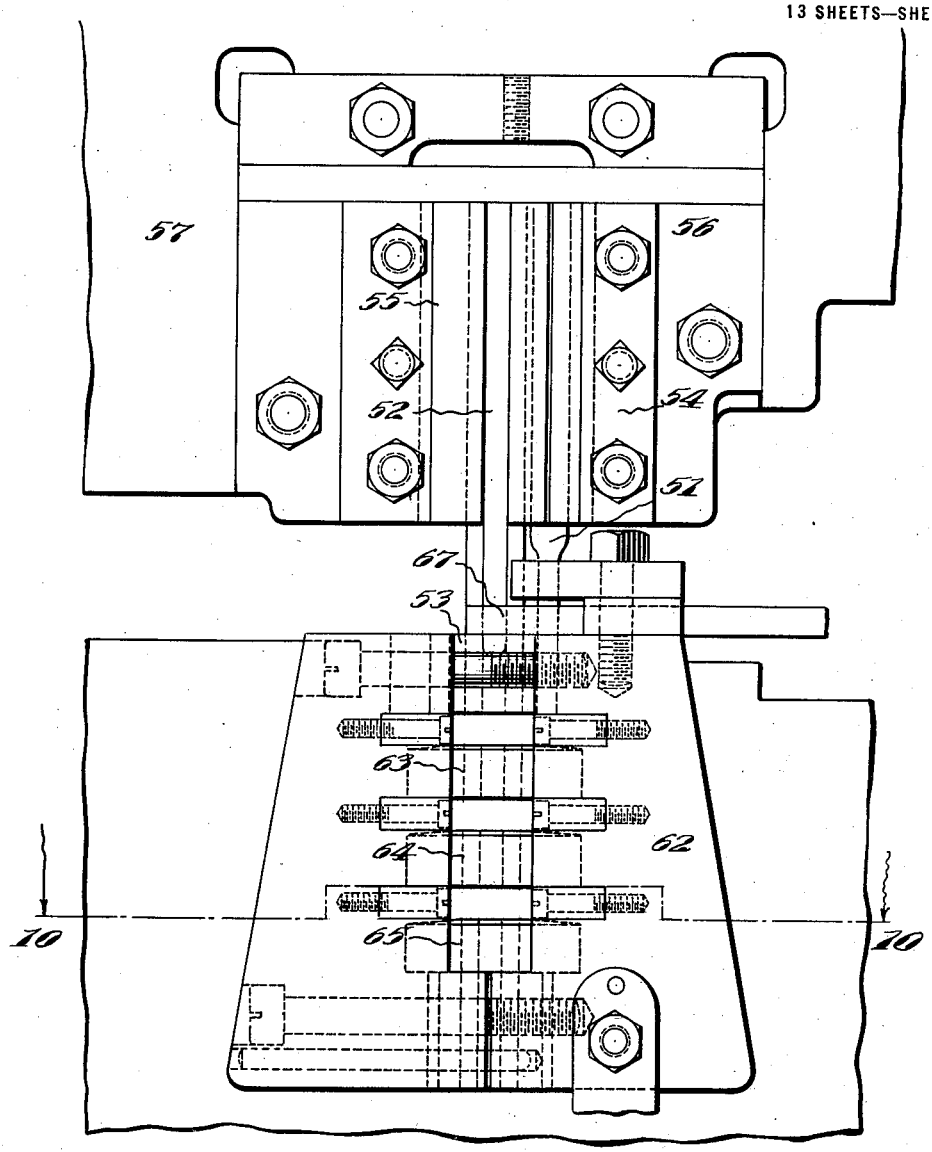
Figure 10:
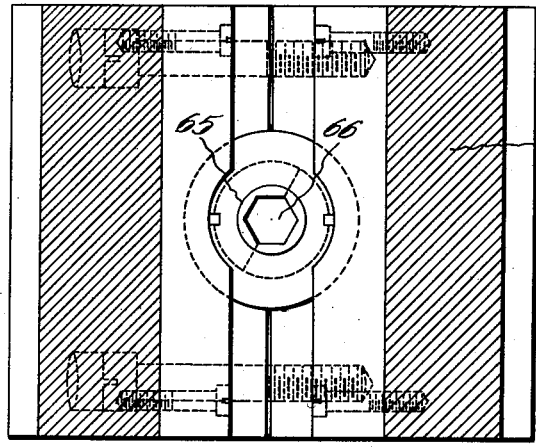

Of the accompanying drawings: Figure 1 shows a plan of the machine. Fig. 2 shows a front elevation. Fig. 3 shows a rear elevation. Fig. 4 shows an elevation looking at the left hand end of the machine. Fig. 5 shows an elevation looking at the right hand end. Fig. 6 is a vertical section on the plane indicated by the dotted line on Fig. 1, looking in the direction indicated by the arrows 6—6. Fig. 7 is a vertical section on the same plane looking in the direction indicated by the arrows 7—7 on Fig. 1. Fig. 8 shows on larger scale a plan of the bar feeding mechanism and the blanking dies. Fig. 9 shows on still larger scale a plan of the die holder and dies, and the piercing punch and cutting off punch. Fig. 10 shows a vertical section of the die holder and dies on the plane indicated by the dotted line 10—10 on Fig. 9. Fig. 11 is a vertical section on the plane indicated by the dotted line 11 on Fig. 1 showing the means for cutting the bar in front of the dies and a portion of the mechanism for transferring the blanks from the dies to the track along which they are pushed to the other end of the machine. Fig. 12 is a vertical section looking toward the rear on the plane indicated by the dotted line 12 on Fig. 1, of the mechanism for transferring the blanks from the track to the carrier in front of the finishing tools. Fig. 13 is a vertical section looking toward the rear, on the plane indicated by the dotted line 13 on Fig. 1 of the mechanism at the left hand end of the machine, for presenting the blanks to the finishing tools and carrying them to the delivery rack. Fig. 14 shows a plan of a portion of the operating and stop mechanisms which cause the machine to stop if the blanks are not properly fed. Fig. 15 shows a portion of the stop mechanism on the plane indicated by the dotted line 15—15 on Fig. 14. Fig. 16 shows a front elevation of a portion of the stop mechanism shown in Fig. 14. Fig. 17 is a side elevation of the double acting slide which carries the tools, showing the way it is reciprocated by an eccentric on the drive shaft.

The bar 1 of suitable metal stock from which the blanks are to be formed, is fed from the back toward the front near the right hand end of the machine. This feeding is effected by intermittently grasping the bar between the feed block 2 that is removably located in the end of an arm 3 which is pivoted on a vertical arbor 4, and the feed block 5 that is removably located on the end of a slide 6 which is mounted on the arm 3. This slide is, by a link 7, connected with a lever 8 which is pivoted on the arm 3 by the stud 9. The lever 8 is, by a link 10, connected with a slide 11 which is adapted to move back and forth in a box 12 that is fastened to the frame, and said slide is connected with an eccentric strap 13 on an eccentric 14 attached to the rear end of the driving shaft 15. (Figs. 1, 8). On the front end, the driving shaft 15 has a gear 16 which meshes with a pinion 17 on the shaft 18 that bears the driving pulley 19. (Fig. 2). When the eccentric moves the slide 11 outward, the lever 8 swings and pushes the slide 6 until the rod is gripped between the feed block 5 and the feed block 2. Further movement of the eccentric then causes the feeder arm 3 to swing on its axis and the bar, now gripped, to be fed into the machine.

The inward movement of the eccentric draws back the slide 11 and causes the lever 8 to swing back and withdraw the slide 6 and the feed block 5 from the bar until the block 20 on the lever 8 engages the screw 21 that is mounted on the arm, and then the further inward movement of these parts causes the arm 3 to swing back, free from the rod, for the next feed. By adjusting the screw 21 the amount of backward movements may be varied in order to change the length of feed which will be given to the bar. The friction of the arm 3 on its axis so that it will not move until after the lever 8 has been swung its full distance in either direction, is determined by the screws 22 that are mounted on portions of the bracket 23 which supports these parts and which turn against the slitted end of the arm that embraces the axis upon which the arm turns. (Fig. 8).

The bar is fed forward through a guide 24 with an opening that is slightly larger than the bar and it is held against one face of the guide so that it will at no time jump back, by studs 25 which are forced against the bar by a spring 26. In order to withdraw the studs 25 so that the bar may be easily slipped into the machine, a slide 95 is provided with wedges 96 which are arranged to engage pins 97 that extend upwardly from the studs. The slide 95 at one end is connected with a handle lever 98 by means of which it can be moved back and forth so that when desired the wedges can be engaged with the pins and the studs forced back against the pressure of the spring 26. (Figs. 8, 11). When the front end of the bar reaches the locality of the piercing and cutting implements, as the punches and dies, it is centered so that it will be accurately located, by studs 27 which are mounted in blocks 28 that are movably supported in the ends of levers 29. These blocks are adjusted toward each other by screws 30 which turn in the ends of the levers. On the other ends of these levers are rolls 31 which, by the action of a spring 32 extending between the levers, are held in contact with the surfaces of a wedge 33. This wedge at the proper time is moved forward and backward adjacent to the bar guideway for the purpose of swinging the levers and causing the studs 27 to release the bar when it is being fed and engage and center the bar just before it is punched and cut. (Fig. 11). The rear end of the wedge 33 is connected with the lever 34 on the upper end of a vertical shaft 35. The lower end of the shaft 35 has a rocker arm 36 that is connected with a rod 37 which extends along the back of the frame and is connected with a lever 38. This lever by a link 39 is connected with an eccentric strap 40 which is reciprocated by an eccentric 41 on a shaft 42 that extends across the left hand end of the machine. (Fig. 3). The shaft 42 on its rear end has a bevel gear 43 that meshes with a bevel gear 44 on a vertical shaft 45 which at its upper end has a bevel gear 46 that meshes with a bevel gear 47 on one end of a shaft 48. The other end of the shaft 48 has a bevel gear 49 which meshes with a bevel gear 50 on the main driving shaft 15. (Fig. 3). By means of this mechanism the bar is firmly held in accurate position while being pierced and cut and is released so that it will feed freely.

When the end of the bar is opposite the piercing punch 51, that punch moves up and punches a hole through it slightly smaller than the size of the finished hole in the nut. On the next feed of the bar the pierced end is located opposite the cutting off punch 52, which approximates the shape of the nut, and when that punch comes up the pierced end of the bar is sheared off and punched into the cutting-off die 53 (Fig. 9). The piercing punch and cutting off punch are, by clamp plates 54 and 55, secured in a punch block 56 that is mounted in one end of a reciprocatory member, or tool slide 57. The tool slide 57 is movable back and forth in horizontal ways arranged on the inner walls of the frame 58. In an opening 59 near the center of this tool slide is a block 60 in which turns an eccentric 61 on the main driving shaft 15. By means of this eccentric and block, which is movable up and down in the opening, the tool slide is reciprocated back and forth. (Fig. 17). The cutting-off punch is set in advance of the piercing punch the thickness of the metal so that when the tool slide moves up, a blank is first cut from the end of the bar and forced into the cutting die and then the piercing punch enters and passes through the bar for piercing the hole in the following blank. Thus, at each movement of the tool slide in one direction, a pierced blank is cut off and a hole is pierced through the bar for the following blank. (Fig. 9).

The cutting die 53 is clamped in die blocks 62 that are mounted in the end of the frame. Outside of the cutting die is the first trimming die 63, then the second trimming die 64 and finally the third trimming die 65. These dies are solid and are held in the die blocks 62. Each of these dies has an opening through it which approximates the shape of the nut, and these openings in the successive dies are each made a few thousandths of an inch smaller than the one before so that the blank is gradually trimmed down to the desired size as it is forced through the dies. Each succeeding blank forces the blanks in front of it through the dies for trimming them in this manner. Projecting from the end of the cutting off punch is a pilot stud 67 which enters the pierced hole and centralizes the blank as it is cut off and pushed into the dies. (Figs. 9, 10).

The blanks as they are pushed through the end of the frame from the dies, are forced into the grasp of fingers 68 and 69, the former of which is fixed to the rocker arm 70 while the latter is pivoted to the rocker arm and drawn closed by a spring 71. (Fig. 5). The arm 70 is mounted on an arbor 72 which carries a pinion 73. Engaging with this pinion is a rack 74 which is connected with a rocker arm 75 on a sleeve 76 that has a rocker arm 77 which is connected to the end of a rod 78. (Fig. 11). The other end of this rod is by a spring yoke 79 connected with the upper end of a lever 80 that bears a roll 81 which engages a cam groove in one face of the disk 82 on the main shaft 15 at the front of the frame. (Figs. 1, 2, 5). By this mechanism the rack is reciprocated and through the pinion turns the rocker arm 70 obliquely 180° so as to carry the blanks that are successively forced into the grip of the fingers 68 and 69 into line with the track along which they are passed to the other end of the machine. (Figs. 5, 11).

The track consists, in the form shown, of three bars 83 spaced from each other so as to just receive the blanks, and mounted on top of the frame so as to extend near the front from the right hand end to near the left hand end of the frame. (Fig. 1). The blanks are pushed from the fingers of the transfer mechanism into the track by an arm 84 on an arbor 85 that bears a pinion 86. (Figs. 5, 11). Engaging this pinion is a rack 87 which is connected with a rocker arm 88 on a sleeve 89 that has a rocker arm 90. This latter rocker arm is connected with a rod 91 that by a spring yoke 92 is connected with the upper end of a lever 93 which has a roll 94 that runs in a cam groove in one face of the cam disk 82. (Figs. 1, 2). By means of this mechanism the rack is reciprocated and the pinion oscillated so the arm 84 will swing and push the blanks from the fingers 68 and 69 onto the track, and then get out of the way. The spring yokes 79 and 92 which connect the cam levers with the rods that operate the racks 74 and 87, yield in case the blanks are not properly positioned so that the parts will not become broken. The arm 84 which pushes the blanks from the transfer mechanism onto the track also causes the following blanks to push those in advance along the track from one end of the machine to the other.

At the end of the track the blanks are pushed one at a time into the grasp of yielding fingers 99, of which there are two pair, that are mounted on arms 100 which project from a hub 101 fastened to the end of a shaft 102. This shaft is reciprocated so the fingers will pick a blank from the track and then rotate 180° so as to pass the blank into the fingers 103 of a star wheel which carries the blank in front of the metal working implements at this end of the machine, as the flattening, chamfering, re-punching and re-trimming dies and coöperative punch, said punch being connected to move with the member 57, and illustrated at 103'. (Fig. 6). The shaft 102 bears a grooved collar 104 which is engaged by the forked upper end of an adjustable lever 105 that is pulled in one direction by a spring 106 and is forced in the other direction by the cam 107 on the shaft 42 that extends along the left hand side of the machine near the bottom. (Fig. 12). The cam 107 through the lever 105 reciprocates this transfer mechanism so that while one set of fingers is taking a blank from the end of the track, the other set of fingers is passing a blank to the fingers of the star wheel.

A pinion 108 turns loosely on a sleeve 109 that is splined on the shaft 102. This pinion has a female clutch part 110 that is adapted to be engaged by a male clutch part 111 on a sleeve which has a grooved collar 112 that is splined on the shaft. Engaging this collar is the upper end of an adjustable lever 113, the lower end of which is drawn in one direction by a spring 113' and forced in the opposite direction by a cam 114 on the shaft 42. The pinion 108 rotates continuously, and when the cam 114 swings the lever 113 and causes the clutch parts to engage, the shaft 102 with the transfer fingers is rotated. (Fig. 12). Meshing with the pinion 108 is an intermediate gear 115 which meshes with a gear 116 that is engaged by a gear 117 in mesh with a gear 118 on the shaft 48 extending along the back of the frame. (Figs. 1, 3, 4). The extent of reciprocation of the lever 105 which reciprocates the shaft 102, is determined by the adjustment of the screws 119 and the extent of movement of the lever 113 which causes the clutch to connect the gear 108 with the shaft 102 for effecting the rotation of the shaft, is adjusted by the screws 120. On the sleeve 109, through which the shaft 102 passes and upon which the gear 108 turns, is an index disk 121, which together with an index bolt accurately determines the time and amount of rotation of the shaft 102 and the transfer fingers which it carries. (Fig. 12). This index disk has notches 122 in its periphery, and adapted to engage these notches is a bolt 123. This bolt is forced toward the index disk by springs 124 and it is withdrawn by an angle lever 125 that is oscillated through the link 126 by the cam 127 on the shaft 42. (Fig. 4). At the proper time this cam withdraws the locking bolt 123 and allows the transfer fingers to be rotated, and then releases the bolt so that its springs throw it into the next notch for stopping the fingers in the correct position.

The star wheel fingers 103 are fastened to a hub 128 that is keyed to a shaft 129. The gear 116 turns loosely on a sleeve 130 that is keyed to this shaft. On one face of the gear 116 is a female clutch part 131 that is adapted to be engaged by the male clutch part 132 on a sleeve 133 that is keyed to the shaft and has a grooved collar at its end. Engaging this grooved collar is a lever 134 that is pulled in one direction by springs 135 and is forced in the other direction by a cam 136 on the shaft 42. This cam at the proper time oscillates the lever and causes the clutch to engage the gear so as to rotate the star wheel. The adjustment of the throw of the parts so as to cause the clutch parts to engage properly is determined by the screws 137. (Fig. 13).

On the sleeve 130 is an index disk 138 which together with an index bolt determines the exact amount of rotation of the star wheel. (Fig. 13). This index disk 138 has five notches 139, and adapted to engage these notches is a bolt 140. Springs 141 draw the bolt into the notches of the index disk, and at the proper time, through the lever 142 and link 143, the bolt is withdrawn by the cam 144 on the cam shaft 42. (Fig. 4). This mechanism carries the blanks in succession from the transfer fingers, in front of the flattening die 145, then in front of the chamfering die 146, then to the re-punching die 147, and finally to the re-trimming die 148. (Fig. 6). These dies are clamped in the hubs 150 that project from the plate 151 which is fastened to the end of the frame. As the blanks are driven into the re-trimming die, those in advance are pushed by those which follow, along the discharge rack 149 and out of the machine. (Fig. 13). The flattening punch 152, the chamfering punch 153, the re-punching punch 154 and the re-trimming punch 155 which are opposite the corresponding dies, are clamped in the end of the tool slide 57 that is reciprocated back and forth by the eccentric on the main shaft, so that the several operations are performed on different blanks at the same time. (Fig 7).

In order to stop and start the machine, the driving gear 16 turns loosely on the driving shaft 15. This gear has clutch parts 156 that are adapted to be engaged by clutch parts 157 on a grooved sleeve 158 which is splined on the shaft 15 and is moved to engage and disengage the clutch parts by a lever 159. This lever is fixed to a vertical shaft 160 which has a rocker arm 161 that is connected by a link 162 with a hand lever 163 on the front of the machine, whereby the driving gear may be clutched or released by hand. (Figs. 1, 2). The clutch may also be operated by the hand lever 164 at the right hand end of the machine. This lever is connected by a link 165 with a rocker arm 166 on a vertical shaft 167 that has a rocker arm 168. This latter rocker arm is connected by a rod 169 with a rocker arm 170 on the lower end of the vertical shaft 160. (Figs. 2, 5).

For stopping the machine in case the transfer wheel and the star wheel do not index properly and correctly present the blanks to the dies and tools, the clutch on the main shaft is automatically disengaged from the driving gear. To accomplish this, the upper end of the vertical shaft 160, which can be moved by the hand levers in front and at the end of the machine, is provided with an arm 171 on the extreme end of which is a pivoted latch 172, that is adapted to be lifted and lowered. When everything is all right, the latch is down in such position that nothing engages with it. However, if the mechanisms are not working properly, this latch is lifted into the path of the plate 173 that is fixed to the end of the trip lever 174 which is fastened to the top of the tool slide 57. The trip lever is adjusted so that the plate 173 will engage the latch 172 at the correct time by means of the screws 175. When the latch is engaged by the trip lever on the tool slide, the arm 171 is moved so as to turn the shaft 160 the same as if that shaft had been turned by the hand levers, and cause the shipper lever to unship the clutch and release the driving gear. (Fig. 14).

Beneath the latch 172 is a sliding wedge 176 which is connected with an angle lever 177 that is pivoted to the front side of the frame. One end of this angle lever is provided with a roll 178 that is adapted to be engaged by a sliding wedge 179 which is held retracted by a spring 180. In case of abnormal operation, this sliding wedge is pushed forward so as to engage the roll and throw the lever which advances the latch wedge and lifts the latch so that it will be engaged by the trip lever on the tool slide. (Fig. 16). In line with the wedge slide 179 are two contact pins 181, 182, the former projecting from the lower end of the lever 183 that is connected with the transfer index locking bolt 123, and the latter projecting from the star wheel index locking bolt 140. (Fig. 4). When the transfer and the star wheel are indexed correctly, these pins are in such positions that they are inactive, but if for any reason the parts are not properly indexed, as when the blanks are misplaced and the index bolts are out to any extent, these pins are in such positions that they will be engaged by wings 184 which are fastened to a pinion 185 which meshes with a gear 186 that is driven by a pinion 187 on the shaft 42. (Figs. 4, 16). The wings 184 by this gearing are rotated at the same speed as the main drive shaft. If either of the index bolts is out of position, its stop pin will be engaged by one of these wings, and when thus engaged that pin is pushed forward so as to engage the end of the wedge slide 179 and through the mechanism described, raise the latch so that it will be engaged by the trip lever on the tool slide and the driving clutch disengaged.

In order to prevent the operator from starting the machine after it has been automatically stopped, as a result of the improper feed of any of the blanks, a lock is provided. This lock consists of a pair of hinged levers 188 that are pivoted to the cap of a bracket 189 which is bolted to the front of the machine. The rear ends of these levers are drawn together by a spring 190 against studs 191 and 192, the former of which extends upwardly from the pin that is carried by the transfer index bolt, and the latter of which projects upwardly from the pin that is carried by the carrier index locking bolt. The studs 191 and 192 normally lie inside of the left hand and adjacent to the ends of levers 188, as viewed in Fig. 14, and prevent the right hand end of these levers from closing under the influence of spring 190. When the pins 181, 182 are engaged by the stop wings 184 and are pushed to the right, the studs 191, 192 move along the adjacent straight faces 300 of the levers 188 and eventually escape from the straight faces on to the curved faces 301, which latter form recesses in the inner adjacent faces of the levers 188 and permit these levers to close under the influence of the spring 190. The stop wedge slide 179 carries a pin 193 which is movable between the right hand ends of the levers 188 and beyond the ends of these levers. The straight faces 300 are of such an extent that the pin 193 is pushed beyond the right hand end of the levers 188 before the studs 191, 192 escape the straight faces 300. If the pin 193 has been pushed past the front ends of the locking levers, these ends close and said pin 193 will be held in its outer position by the ends of these levers thus retaining the wedge slide 179 and connected parts in such positions that the main clutch will be held disengaged. After the fault has been remedied and the parts properly indexed, the ends of the levers 188 can be opened to permit the wedge 179 to be drawn back so that the clutch can be engaged and the machine started up with all the parts properly timed.

The invention claimed is:

1. In a nut machine, in combination with a reciprocating ram and means for reciprocating said ram, blanking punches mounted on the ram at one end, finishing punches mounted on the ram at the other end, blanking dies mounted on the frame at one end, finishing dies mounted on the frame at the other end, mechanism for feeding stock between the blanking punches and dies, means for conducting the blanks from one end to the other, oscillatory mechanism for transferring the blanks from the blanking dies to and advancing them along the conductor, a rotatory carrier for presenting the blanks between the finishing punches and dies, and rotatory mechanism for transferring the blanks from the conductor to the carrier.

2. In a nut machine, in combination with a reciprocating ram and means for reciprocating said ram, punches mounted on the ram at one end, punches mounted on the ram at the other end, dies mounted on the frame at one end, dies mounted on the frame at the other end, mechanism for feeding stock between the punches and dies at one end, a track for guiding the blanks from one end of the machine to the other, oscillatory mechanism for transferring the blanks from the dies to and advancing them along the track, a carrier for presenting the blanks between the punches and dies at the other end, and rotatory mechanism for transferring the blanks from the track to the carrier.

3. In a nut machine, in combination with a reciprocating ram and means for reciprocating said ram, punches mounted on the ram at one end, punches mounted on the ram at the other end, dies mounted on the frame at one end, dies mounted on the frame at the other end, oscillatory mechanism for feeding stock between the punches and dies at one end, a track for guiding the blanks from one end of the machine to the other, oscillatory mechanism for transferring the blanks from the dies to and advancing them along the track, a carrier for presenting the blanks between the punches and dies at the other end, and rotatory mechanism for transferring the blanks from the track to the carrier.

4. In a nut machine, in combination with a reciprocating ram and means for reciprocating said ram, blanking punches mounted on the ram at one end, finishing punches mounted on the ram at the other end, blanking dies mounted on the frame at one end, finishing dies mounted on the frame at the other end, mechanism for feeding stock between the blanking punches and dies, means for conducting the blanks from one end to the other, oscillatory mechanism for transferring the blanks from the blanking dies to and advancing them along the conductor, a rotatory carrier for presenting the blanks between the finishing punches and dies, rotatory mechanism for transferring the blanks from the conductor to the carrier, and mechanisms for stopping the machine should the blanks become misplaced between the finishing punches and dies.

5. In a nut machine, in combination with a reciprocating ram and means for reciprocating said ram, punches mounted on the ram at one end, punches mounted on the ram at the other end, dies mounted on the frame at one end, dies mounted on the frame at the other end, mechanism for feeding the stock between the punches and dies at one end, mechanism for feeding the blanks between the punches and dies at the other end, means for conducting the blanks from one end of the machine to the other, oscillatory mechanism for transferring the blanks from the dies at one end to the conductor, and rotatory mechanism for transferring the blanks from the conductor to said dies at the other end.

6. In a nut machine, in combination with a reciprocating ram and means for reciprocating said ram, punches mounted on the ram at one end, punches mounted on the ram at the other end, dies mounted on the frame at one end, dies mounted on the frame at the other end, oscillatory mechanism for feeding stock between the punches and dies at one end, rotatory mechanism for feeding the blanks between the punches and dies at the other end, a track for guiding the blanks from one end of the machine to the other, oscillatory mechanism for transferring the blanks to one end of the track, and rotatory mechanism for transferring the blanks from the other end of the track.

7. In a mechanism of the nature disclosed, in combination, a reciprocatory member, metal working implements carried thereby and adapted to operate, respectively, on each stroke of the member, a feeder for introducing stock in the path of the implement acting on one stroke, means for receiving and conveying the stock operated on into the path of the implement acting on the other stroke comprising a track for the blanks, said feeder comprising an oscillatory arm, a stationary feed block thereon, a movable feed block thereon adapted to coöperate with the stationary block to alternately grip and release a bar of stock, and means to oscillate said arm comprising a lever pivoted to said arm and a link connecting said lever and said movable feed block, the movement of said lever being adapted to effect both the advance and return movement of said reciprocatory member.

8. In a mechanism of the nature disclosed, in combination, a reciprocatory member, metal working implements carried thereby and adapted to operate, respectively, on each stroke of the member, a feeder for introducing stock in the path of the implement acting on one stroke, means for receiving and conveying the stock operated on into the path of the implement acting on the other stroke comprising a track for the blanks, said feeder comprising an oscillatory arm provided with means to grip and release the bar of stock, a guide along which the bar is fed by said feeder, spring pressed studs adapted to press said bar against said guide, and hand operated means adapted to withdraw said studs from said guide to permit free passage of said bar.

9. In a mechanism of the nature disclosed, in combination, a reciprocatory member, metal working implements carried thereby and adapted to operate, respectively, on each stroke of the member, a feeder for introducing stock in the path of the implement acting on one stroke, means for receiving and conveying the stock operated on into the path of the implement acting on the other stroke comprising a track for the blanks, said feeder comprising an oscillatory arm provided with means to grip and release the bar of stock, a guide along which the bar is fed by said feeder, spring pressed studs adapted to press said bar against said guide, and hand operated means comprising a slidable wedge adapted to withdraw said studs from said guide to permit free passage of said bar.

10. In a mechanism of the nature disclosed, in combination, a reciprocatory member, metal working implements carried thereby and adapted to operate, respectively, on each stroke of the member, a feeder for introducing stock in the path of the implement acting on one stroke, and means for receiving and conveying the stock operated on into the path of the implement acting on the other stroke comprising a track for the blanks and a movable carrier adapted to transfer the blanks to said track.

11. In a mechanism of the nature disclosed, in combination, a reciprocatory member, metal working implements carried thereby and adapted to operate, respectively, on each stroke of the member, a feeder for introducing stock in the path of the implement acting on one stroke, means for receiving and conveying the stock operated on into the path of the implement acting on the other stroke comprising a track for the blanks, a rotatable member adapted to receive blanks from said track, means comprisng a timed clutch adapted to rotate said last-mentioned member, a rotatable blank-positioning device adapted to receive blanks from said rotatable member, means comprising a timed clutch adapted to rotate said positioning device, and means for limiting the amount of rotation of said rotatable member and said blank-positioning devices by said clutches.

12. In a mechanism of the nature disclosed, in combination, a reciprocatory member, metal working implements carried thereby and adapted to operate, respectively, on each stroke of the member, a die through which blanks are pressed by one of said implements, a feeder for introducing stock in the path of the implement acting on one stroke, means for receiving and conveying the stock operated on into the path of the implement acting on the other stroke comprising a track for the blanks, a blank transfer device adapted to oscillate between the discharge end of said die and said track, and into which the blanks are successively moved by said implement, means adapted to discharge the blank held by said device into said track, and means adapted to oscillate said device.

13. In a mechanism of the nature disclosed, in combination, a reciprocatory member, metal working implements carried thereby and adapted to operate, respectively, on each stroke of the member, a die through which blanks are pressed by one of said implements, a feeder for introducing stock in the path of the implement acting on one stroke, means for receiving and conveying the stock operated on into the path of the implement acting on the other stroke comprising a track for the blanks, a blank transfer device adapted to oscillate between the discharge end of said die and said track, and into which the blanks are successively moved by said implement, means adapted to discharge the blank held by said device into said track, and means adapted to oscillate said device, comprising a rock shaft to which the device is fastened, a pinion on said shaft, a rack coöperative with said pinion, a rotatable cam, and operative connections between said cam and rack.

14. In a mechanism of the nature disclosed, in combination, a reciprocatory member, metal working implements carried thereby and adapted to operate, respectively, on each stroke of the member, a die through which blanks are pressed by one of said implements, a feeder for introducing stock in the path of the implement acting on one stroke, means for receiving and conveying the stock operated on into the path of the implement acting on the other stroke comprising a track for the blanks, a blank transfer device adapted to oscillate between the discharge end of said die and said track, and into which the blanks are successively moved by said implement, means adapted to discharge the blank held by said device into said track, comprising a cam operated oscillatable arm, and means adapted to oscillate said device comprising a rock shaft, a rack shaft to which the device is fastened, a pinion on said shaft, a rack coöperative with said pinion, a rotatable cam, and operative connections between said cam and rack.

15. In a mechanism of the nature disclosed, in combination, metal working implements spaced apart, a track adapted to conduct blanks produced by one implement toward the other, means comprising a movable carriage, adapted to receive the blanks produced by one implement and transfer them to said track, and means comprising a rotatable carrier adapted to transfer blanks from said track into position to be operated upon by the other implement.

16. In a mechanism of the nature disclosed, in combination, metal working implements spaced apart, a track adapted to conduct blanks produced by one implement toward the other, means comprising a movable carriage and a blank discharging arm adapted to receive the blanks produced by one implement and transfer them to said track, and means comprising a rotatable carrier adapted to transfer blanks from said track into position to be operated upon by the other implement.

17. In a mechanism of the nature disclosed, in combination, metal working implements spaced apart, a track adapted to conduct blanks produced by one implement toward the other, means comprising an oscillatable carrier and a blank discharging arm adapted to receive the blanks produced by one implement and transfer them to said track, and means comprising a rotatable carrier adapted to transfer blanks from said track into position to be operated upon by the other implement.

18. In a mechanism of the nature disclosed, in combination, metal working implements spaced apart, a track adapted to conduct blanks produced by one implement toward the other, an oscillatable carrier and a blank discharging arm adapted to receive the blanks produced by one implement and transfer them to said track, a pinion on said carrier, a rack coöperating with said pinion, a cam and connections therefrom to reciprocate said rack, and means comprising a rotatable carrier adapted to transfer blanks from said track into position to be operated upon by the other implement.

19. In a mechanism of the nature disclosed, in combination, metal working implements spaced apart, a track adapted to conduct blanks produced by one implement toward the other, means comprising a movable carrier, adapted to receive the blanks produced by one implement and transfer them to said track, and means comprising a rotatable carrier and a star wheel adapted to transfer blanks from said track into position to be operated upon by the other implement.

20. In a mechanism of the nature disclosed, in combination, metal working implements spaced apart, a track adapted to conduct blanks produced by one implement toward the other, means comprising a movable carrier, adapted to receive the blanks produced by one implement and transfer them to said track, and means comprising a rotatable carrier and a star wheel adapted to transfer blanks from said track into position to be operated upon by the other implement, said rotatable carrier comprising a plurality of blank carriers adapted to, respectively, receive a blank from said track and simultaneously to deliver another blank to said star wheel.

21. In a mechanism of the nature disclosed, in combination, metal working implements spaced apart, a track adapted to conduct blanks produced by one implement toward the other, means comprising a movable carrier, adapted to receive the blanks produced by one implement and transfer them to said track, and means comprising a rotatable carrier and a star wheel adapted to transfer blanks from said track into position to be operated upon by the other implement, and clutch elements adapted to effect the rotary movements of said rotatable carrier and said star wheel at predetermined intervals and for predetermined amounts.

22. In a mechanism of the nature disclosed, in combination, metal working implements spaced apart, a track adapted to conduct blanks produced by one implement toward the other, means comprising a movable carrier, adapted to receive the blanks produced by one implement and transfer them to said track, means comprising a rotatable carrier adapted to transfer blanks from said track into position to be operated upon by the other implement, means to intermittently rotate said rotatable carrier, comprising a continuously rotatable friction clutch element, a coöperative rotatable clutch element connected to rotate said rotatable carrier and movable carriage into and out of operative engagement with said first mentioned clutch element, an index disk rotatable with said rotatable carrier, and a bolt movable into and out of engagement with said disk to alternately permit and stop rotation of said disk at predetermined times.

23. In a mechanism of the nature disclosed, in combination, metal working implements spaced apart, a track adapted to conduct blanks produced by one implement toward the other, means comprising a movable carrier, adapted to receive the blanks produced by one implement and to transfer them to said track, means comprising a rotatable carrier and a star wheel adapted to transfer blanks from said track into position to be operated upon by the other implement, coöperative clutch elements for effecting intermittent rotation of said rotatable carrier and said star wheel at predetermined intervals, indexing devices for predetermining the extent of intermittent rotary movements of said rotary carrier and said star wheel, and means coöperative with said indexing device adapted to cut off the power of the machine on abnormal operation of said rotary carrier and said star wheel.

24. In a mechanism of the nature disclosed, in combination, metal working implements spaced apart, a track adapted to conduct blanks produced by one implement toward the other, means comprising a movable carrier, adapted to receive the blanks produced by one implement and transfer them to said track, means comprising a rotatable carrier and a star wheel adapted to transfer blanks from said track into position to be operated upon by the other implement index disks connected to rotate with said rotatable carrier and said star wheel, index bolts adapted to determine the extent of the intermittent rotary movement of said rotary carrier and said star wheel, a driving clutch for the machine, a shift device for said driving clutch comprising a movable latch, a movable trip device adapted to operate said shift device, and means, dependent for operation on the position of said bolts, adapted to position said latch in the path of said trip device.

DAVID JULIAN.

Witnesses:
CHARLES T. BRENNAN,
NATHL. R. BRONSON.